(12) United States Patent
He et al.

(10) Patent No.: US 12,741,860 B2
(45) Date of Patent: Sep. 22, 2026

(54) FEEDING DEVICE FOR INTELLIGENT COOKING MACHINE

(71) Applicant: Shanghai Aican Robot (Group) Co., Ltd., Shanghai (CN)

(72) Inventors: Qing He, Shanghai (CN); Guang He, Shanghai (CN); Gang Liu, Shanghai (CN); Zhenquan Lin, Shanghai (CN)

(73) Assignee: SHANGHAI AICAN ROBOT (GROUP) CO., LTD., Shanghai (CN)

( * ) Notice: Subject to any disclaimer, the term of this patent is extended or adjusted under 35 U.S.C. 154(b) by 162 days.

(21) Appl. No.: 18/762,601

(22) Filed: Jul. 2, 2024

(65) Prior Publication Data

US 2024/0351857 A1 Oct. 24, 2024

Related U.S. Application Data

(63) Continuation of application No. PCT/CN2023/119556, filed on Sep. 19, 2023.

(30) Foreign Application Priority Data

Mar. 1, 2023 (CN) ........................ 202310180078.5

(51) Int. Cl.
*A47J 37/10* (2006.01)
*A23L 5/10* (2016.01)
(Continued)

(52) U.S. Cl.
CPC ................ *B67D 3/008* (2013.01); *A23L 5/11* (2016.08); *A47J 27/00* (2013.01); *A47J 36/00* (2013.01);
(Continued)

(58) Field of Classification Search
CPC ....... B67D 3/008; A47J 37/10; A47J 37/1228; A47J 36/00; A47J 27/00;
(Continued)

(56) References Cited

U.S. PATENT DOCUMENTS 5,249,510 A * 10/1993 Rozak ................ A47J 37/1228 99/344

FOREIGN PATENT DOCUMENTS

CN 204158182 U 2/2015
CN 104739222 A 7/2015
(Continued)

*Primary Examiner* — Frederick C Nicolas
(74) *Attorney, Agent, or Firm* — MATTHIAS SCHOLL P.C.; Matthias Scholl

(57) ABSTRACT

A feeding device for an intelligent cooking machine, including a base frame, at least one ingredient box, at least one door panel, at least one door opening mechanism, at least one door opening motor, at least one door closing mechanism, and at least one door closing motor. The at least one ingredient box matches with the at least one door panel in number; at least one door panel is disposed on the base frame; the at least one door opening mechanism and the at least one door opening motor are configured to control an opening of the at least one door panel; the at least one door closing mechanism and the at least one door closing motor are configured to control a reset and closure of the at least one door panel; the at least one door opening mechanism is disposed on the base frame.

9 Claims, 7 Drawing Sheets

(51) Int. Cl.

| | |
|---|---|
| ***A47J 27/00*** | (2006.01) |
| ***A47J 36/00*** | (2006.01) |
| ***A47J 37/12*** | (2006.01) |
| ***B67D 3/00*** | (2006.01) |
| ***E05B 15/04*** | (2006.01) |
| ***E05B 15/10*** | (2006.01) |
| ***E05B 47/02*** | (2006.01) |
| ***E05B 65/00*** | (2006.01) |

(52) U.S. Cl.
CPC ........... *A47J 37/10* (2013.01); *A47J 37/1228* (2013.01); *E05B 15/108* (2013.01); *E05B 47/023* (2013.01); *E05B 65/0003* (2013.01); *E05B 2015/0458* (2013.01)

(58) Field of Classification Search
CPC ........... E05B 2015/0458; E05B 15/108; E05B 47/023; E05B 65/0003; A23L 5/11
See application file for complete search history.

(56) References Cited

FOREIGN PATENT DOCUMENTS

| | | | | |
|---|---|---|---|---|
| CN | 204654568 U | | 9/2015 | |
| CN | 208640368 U | | 3/2019 | |
| CN | 114041701 A | | 2/2022 | |
| CN | 215820614 U | * | 2/2022 | ............. A47J 36/00 |
| CN | 217610575 U | | 10/2022 | |
| CN | 219000123 U | | 5/2023 | |
| CN | 219000129 U | | 5/2023 | |
| CN | 219000130 U | | 5/2023 | |
| WO | 2022105905 A1 | | 5/2022 | |

* cited by examiner 92
91
942
6
752
71
92
942

FEEDING DEVICE FOR INTELLIGENT COOKING MACHINE

CROSS-REFERENCE TO RELATED APPLICATIONS

This application is a continuation-in-part of International Patent Application No. PCT/CN2023/119556 with an international filing date of Sep. 19, 2023, designating the United States, now pending, further claims foreign priority benefits to Chinese Patent Application No. 202310180078.5 filed Mar. 1, 2023. The contents of all of the aforementioned applications, including any intervening amendments thereto, are incorporated herein by reference. Inquiries from the public to applicants or assignees concerning this document or the related applications should be directed to: Matthias Scholl P.C., Attn.: Dr. Matthias Scholl Esq., 245 First Street, 18th Floor, Cambridge, MA 02142.

BACKGROUND

The disclosure relates to an intelligent cooking machine, and more particularly, to a feeding device for an intelligent cooking machine.

For intelligent cooking machines equipped with a frying pan, feeding ingredients into the frying pan is a crucial step. Conventionally, there are two feeding methods as follows:

1. Film tearing method: placing an ingredient box sealed by a protection film upside down in the intelligent cooking machine; tearing the protective film with a cutting mechanism, whereby the ingredients fall into the frying pan under gravity.
2. Inverted feeding method: fixing the ingredient box with its opening upwards in the feeding device; when cooking, rotating the ingredient box by 180 degrees to overturn the opening thereof; and uncovering the door panel of the feeding device and the ingredients fall into the frying pan.

The two methods have the following drawbacks:

1. Film tearing method: the sequencing of the ingredient boxes is fixed, so that the opening of the ingredient boxes follows a set order and cannot be selected according to personal preferences; the ingredient boxes are not reusable; in addition, the operation of tearing the protective films on the ingredient boxes is not easy and not intelligent.
2. Inverted feeding method: the feeding device must rotate 180 degrees during cooking, requiring additional space and making the intelligent cooking machine larger; and the feeding device is complex, bulky, and costly, and is difficult to clean.

SUMMARY

To solve the aforesaid problems, the disclosure provides a feeding device for an intelligent cooking machine.

The feeding device comprises a base frame, at least one ingredient box, at least one door panel, at least one door opening mechanism, at least one door opening motor, at least one door closing mechanism, and at least one door closing motor. The at least one ingredient box matches with the at least one door panel in number. The at least one door panel is disposed on the base frame. The at least one door opening mechanism and the at least one door opening motor are configured to control the opening of the at least one door panel. The at least one door closing mechanism and the at least one door closing motor are configured to control the reset and closure of the at least one door panel. The at least one door opening mechanism is disposed on the base frame. The at least one door opening mechanism comprises a lock comprising a lock bolt. The lock bolt is movable from a locked position to an open position, allowing the at least one door panel to remain open. When the at least one door closing mechanism moves the at least one door panel from the open position back to a closed position, a main control circuit controls the lock bolt to return to the locked position, thereby ensuring that the at least two door panels are securely locked.

In a class of this embodiment, the lock bolt is a double-action lock bolt; the feeding device comprises at least two ingredient boxes and at least two door panels; the at least two door panels are disposed adjacent to each other. The double-action lock bolt comprises a first lock head and a second lock head. The first lock head is moved to the open position and disengages from the corresponding door panel, thereby allowing the corresponding door panel to open. The movement of the first lock head causes the second lock head to rotate toward the adjacent door panel, thereby ensuring that the adjacent door panel is closed.

In a class of this embodiment, the at least one door opening mechanism further comprises a toggling clamp, a shaft positioning member, and a spring plate. The toggling clamp comprises a toggling handle. The shaft positioning member is fixedly disposed on the base frame. The lock further comprises a plate receiver and a lock shaft. The lock shaft is disposed in the shaft positioning member. The toggling clamp is disposed outside the base frame. The lock shaft is connected to the toggling clamp, such that the lock is controlled by the toggling clamp. The at least one door opening motor comprises a drive handle and a first output shaft. The drive handle is connected to the first output shaft. When the at least one door opening motor is activated, the first output shaft rotates, causing the drive handle to rotate from the closed position in one direction. As the drive handle rotates, the toggling handle is pressed, causing the lock bolt to rotate away from the corresponding door panel. When the drive handle rotates from the closed positon in the opposite direction, the lock bolt is rotated away from the adjacent door panel. The spring plate is disposed on the plate receiver. When the drive handle is rotated to the closed position, the spring plate pushes the lock bolt back to the closed position, thereby ensuring that the corresponding door panel is closed.

In a class of this embodiment, the at least one door closing mechanism comprises a driven gear, a transmission shaft, a door closing plate, and a drive gear. The drive gear is an incomplete gear. The at least one door closing motor comprises a second output shaft. The drive gear is sleeved on the second output shaft. The driven gear is disposed outside the base frame. The drive gear is in external mesh with the driven gear. The driven gear is sleeved on one end of the transmission shaft. The at least two door panels separately comprise a hinge sleeved on the transmission shaft. The at least two door panels are pivotally disposed on the transmission shaft. The door closing plate comprises a shaft sleeve portion and a support plate. The shaft sleeve portion is disposed between the at least two hinges. The shaft sleeve portion is fixedly connected to the transmission shaft. When the support plate and corresponding two door panels are in a horizontal state, parts of the support plate overlap with parts of the two adjacent door panels. When the at least one door closing motor drives the drive gear to rotate forward, the support plate lifts the corresponding two door panels to the closed position.

In a class of this embodiment, after the support plate lifts the corresponding two door panels to the closed position, the corresponding two door panels are locked by the lock bolt, and the drive gear is rotated reversely to disengage from the driven gear.

In a class of this embodiment, the intelligent cooking machine further comprises a machine frame; and the base frame comprises a frame handle; the frame handle allows an operator to manually insert the feeding device into the machine frame; the frame handle is disposed on one side of the feeding device, and the side defined as the front side of the feeding device.

In a class of this embodiment, the at least two door panels separately comprise a bottom surface and a knob; and the knob is disposed on the bottom surface to open the corresponding door panel before adding ingredients into the at least two ingredient boxes.

In a class of this embodiment, the at least two ingredient boxes comprise hard plastic. The base frame comprises a support frame and a crossbeam. The support frame is rectangular in shape. The crossbeam is connected to the support frame, thereby forming two windows within the support frame. The at least two ingredient boxes respectively pass through the two windows. The at least two ingredient boxes separately comprises a rim disposed on a perimeter of each of the two windows. The at least two door panels are separately pressed against the corresponding window. Each of the at least two door panels comprises a first seal ring disposed on the rim.

In a class of this embodiment, the at least two ingredient boxes comprise hard plastic. The base frame comprises a support frame and a crossbeam. The support frame is rectangular in shape. The crossbeam is connected to the support frame, thereby forming two windows within the support frame. Each of the at least two ingredient boxes is fixedly disposed on a bottom surface of the base frame through a snap-fit joint. The at least two door panels are separately pressed against the corresponding window. Each of the at least two door panels comprises a second seal ring disposed between the corresponding door panel and the corresponding window.

The following advantages are associated with the feeding device of the disclosure.

The ingredient box assembly comprises a unit of multiple structural components, including but not limited to the base frame, the door panel, key components of the at least one door opening mechanism, and key components of the at least one door closing mechanism). The ingredient box assembly is provided for convenient detachable insertion into or removal from a dispersing area of the intelligent cooking machine, thereby facilitating easy cleaning and maintenance of the multiple structural components. Once the ingredient box assembly is removed, there are no obstructions blocking access to the walls of the dispersing area. Users can clean all parts of the walls around the dispersing area more effectively. The at least one door closing mechanism is integrated with the at least one door opening mechanism, enabling the door panel to be opened as needed and automatically reset, thus achieving a high level of automation.

Figure 1:
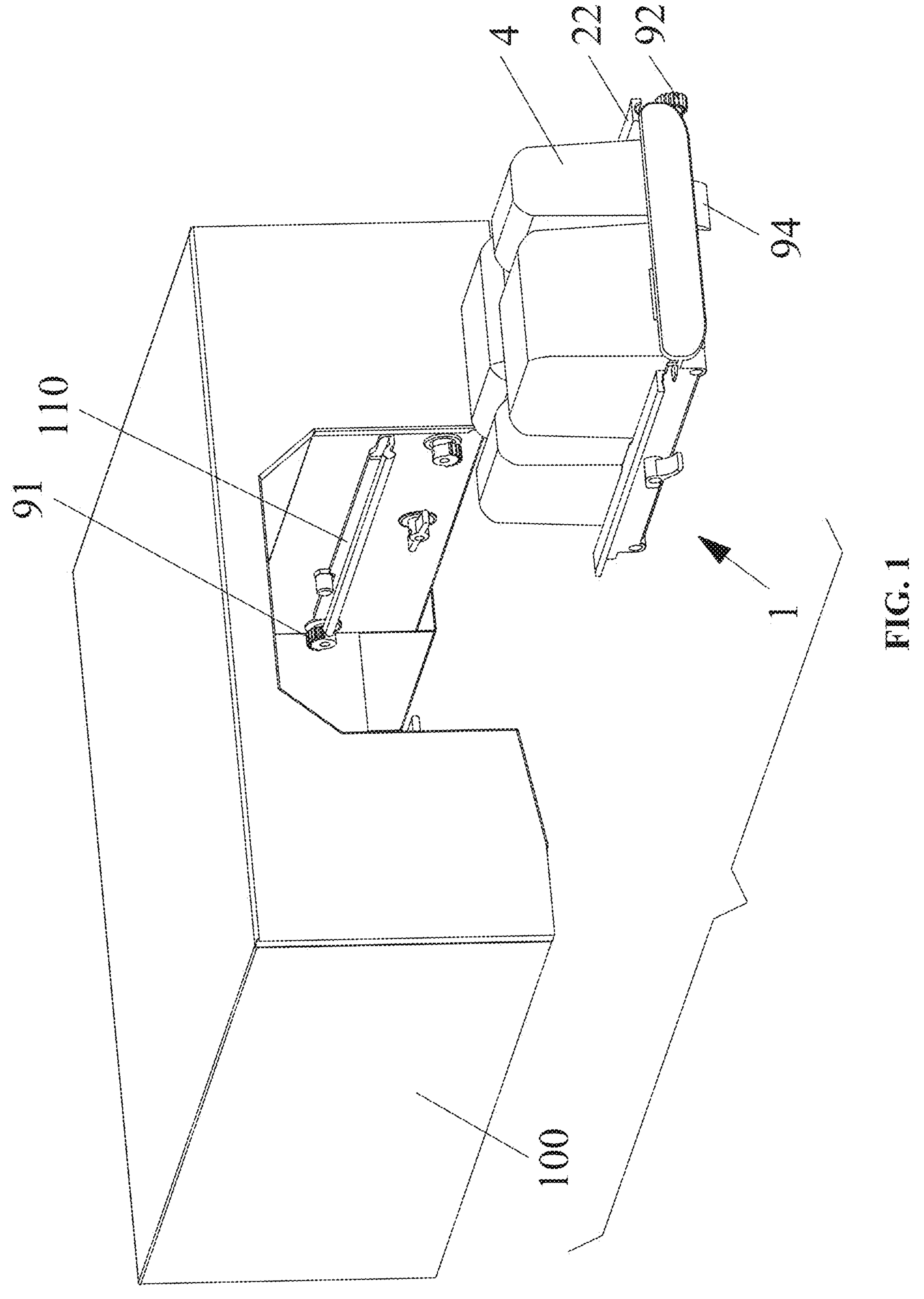
FIG. 1 is a perspective view of an ingredient box assembly being detached from a dispensing area of an intelligent cooking machine according to one embodiment of the disclosure.

In the drawings, the following reference numbers are used: Frame body—100; Support rail—110; Ingredient box assembly—1; Support frame—2; Crossbeam—21; Mounting plate—22; Frame handle—23; Door panel—3; Hinge—31; Knob—32; Ingredient box—4; Door opening motor—5; Drive handle—6; Lock—7; Lock bolt—71; Lock head—711; Lock shaft—72; Plate receiver—73; Shaft positioning member—74; Toggling clamp—75; Shaft sleeve—751; Toggling handle—752; Spring plate—76; Door closing motor—8; Drive gear—91; Driven gear—92; Transmission shaft—93; Door closing plate—94; Shaft sleeve portion—941; and Support plate—942.

DETAILED DESCRIPTION

To further illustrate the disclosure, embodiments detailing a feeding device for an intelligent cooking machine are described below. It should be noted that the following embodiments are intended to describe and not to limit the disclosure.

An intelligent cooking machine comprises a feeding device. The feeding device comprises an ingredient box assembly 1, two door opening motors 5, two door opening mechanisms, two door closing motors 8, and two door closing mechanisms. Each of the two door opening mechanisms comprises a plurality of components, including, but not limited to, a drive handle 6. Each of the two door closing mechanisms comprises a plurality of components, including, but not limited to, a drive gear 91. The ingredient box assembly 1 comprises a base frame 2, four door panels 3, four ingredient boxes 4, the components of the two door closing mechanisms excluding the drive gear 91, and the components of the two door opening mechanisms excluding the drive handle 6. The four door panel 3 are disposed on the base frame 2. The two door opening mechanisms and the two door opening motors 5 are configured to control the release and opening of the four door panels 3. The two door closing mechanisms and the two door closing motors 8 are configured to control the reset and closure of the four door panels 3.

The intelligent cooking machine further comprises a frame body 100 and a frying pan. The feeding device is disposed inside the frame body 100 and is disposed directly above the frying pan (not shown in the drawings). The frying pan comprises a cooking surface disposed in an upward direction. A central axis of the drying pan is perpendicular to the ground.

As shown in FIG. 1, the intelligent cooking machine further comprises a machine frame. The frame body 100 is rectangular in shape and is fixedly disposed onto the top surface of the machine frame. The frame body 100 comprises a top plate serving as a top surface of the intelligent cooking machine. The frame body 100 further comprises a dispensing area configured to accommodate the feeding device. The dispensing area is defined by a first side wall, a second side wall, a top cover, and a rear wall. The dispersing area comprises an opening disposed opposite to the rear wall. The frame body 100 further comprises a panel, and the opening is disposed on the panel.

The frame body further comprises a first support rail 110 and a second support rail 110 respectively disposed on the first side wall and the second side wall.

The base frame 2 comprises a support frame. The support frame comprises a first edge and a second edge disposed opposite to the first edge. The ingredient box assembly 1 further comprises two mounting plates 22 and two sliders. The two mounting plates 22 extend outwardly from the first edge and the second edge, respectively. The two sliders are respectively disposed on the two mounting plates 22. With the four ingredient boxes 4 facing down, the ingredient box assembly 1 is inserted into the dispensing area through the opening and disposed on the first support rail and the second support rail, so that the two sliders are respectively slidable along the first support rail and the second support rail, allowing for convenient assembly and disassembly of the ingredient box assembly 1. When the ingredient box assembly 1 is inserted into the dispersing area, the four door panels 3 are locked.

Upon completion of the cooking process, the ingredient box assembly is removed from the dispersing area, while the first support rail, the second support rail, the drive gear 91, and the drive handle 6 remain attached to the first side wall and the second side wall. The design enables easy cleaning and maintenance of the structural components of the ingredient box assembly. Upon removal of the ingredient box assembly, there are no obstructions blocking access to the walls of the dispersing area. Users can also clean all parts of the walls surrounding the dispersing area more effectively.

1. Ingredient Box 4 and Base Frame 2

Figure 2:
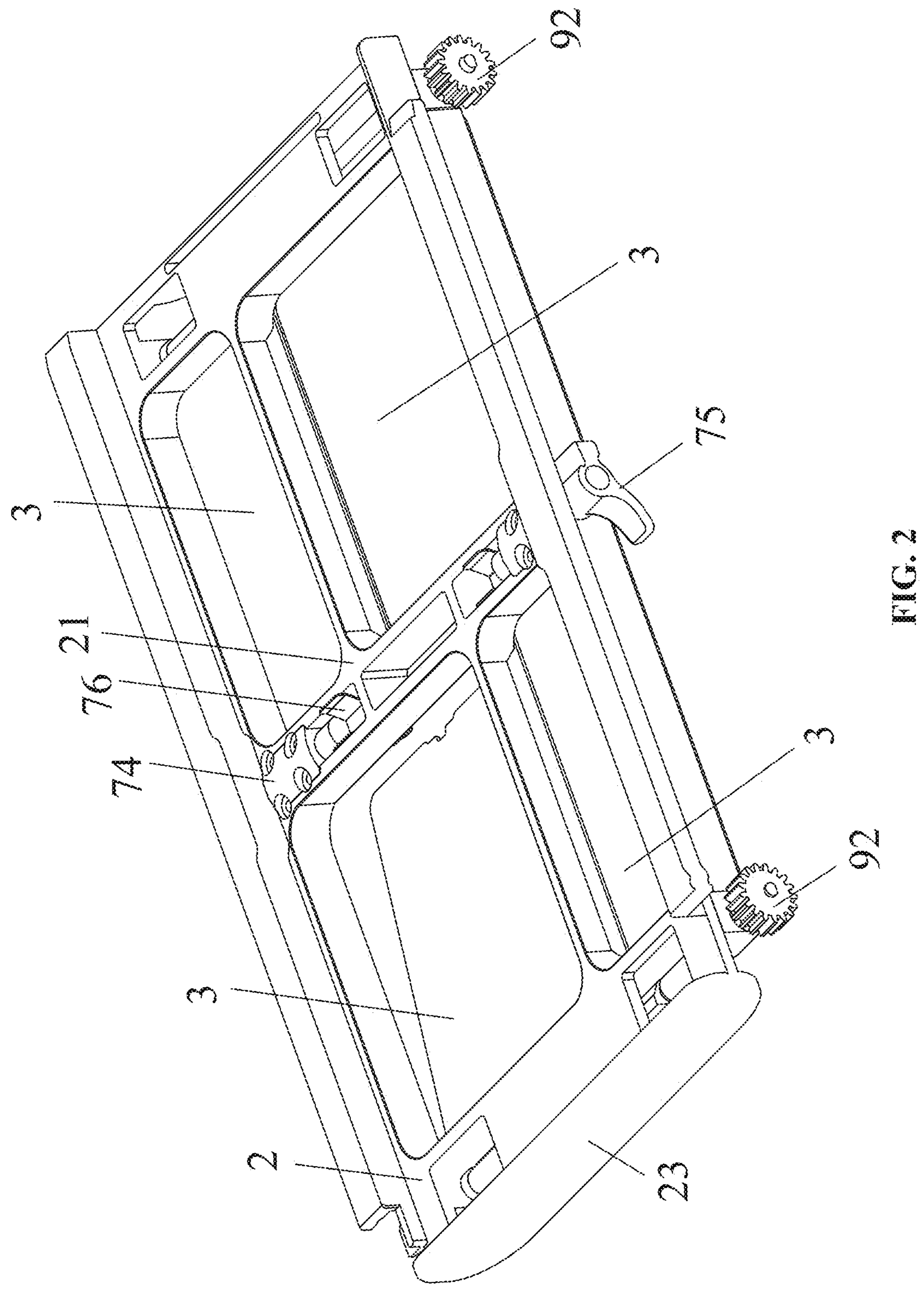
FIG. 2 is a perspective view of a base frame and a door opening mechanism according to one embodiment of the disclosure.
Figure 3:
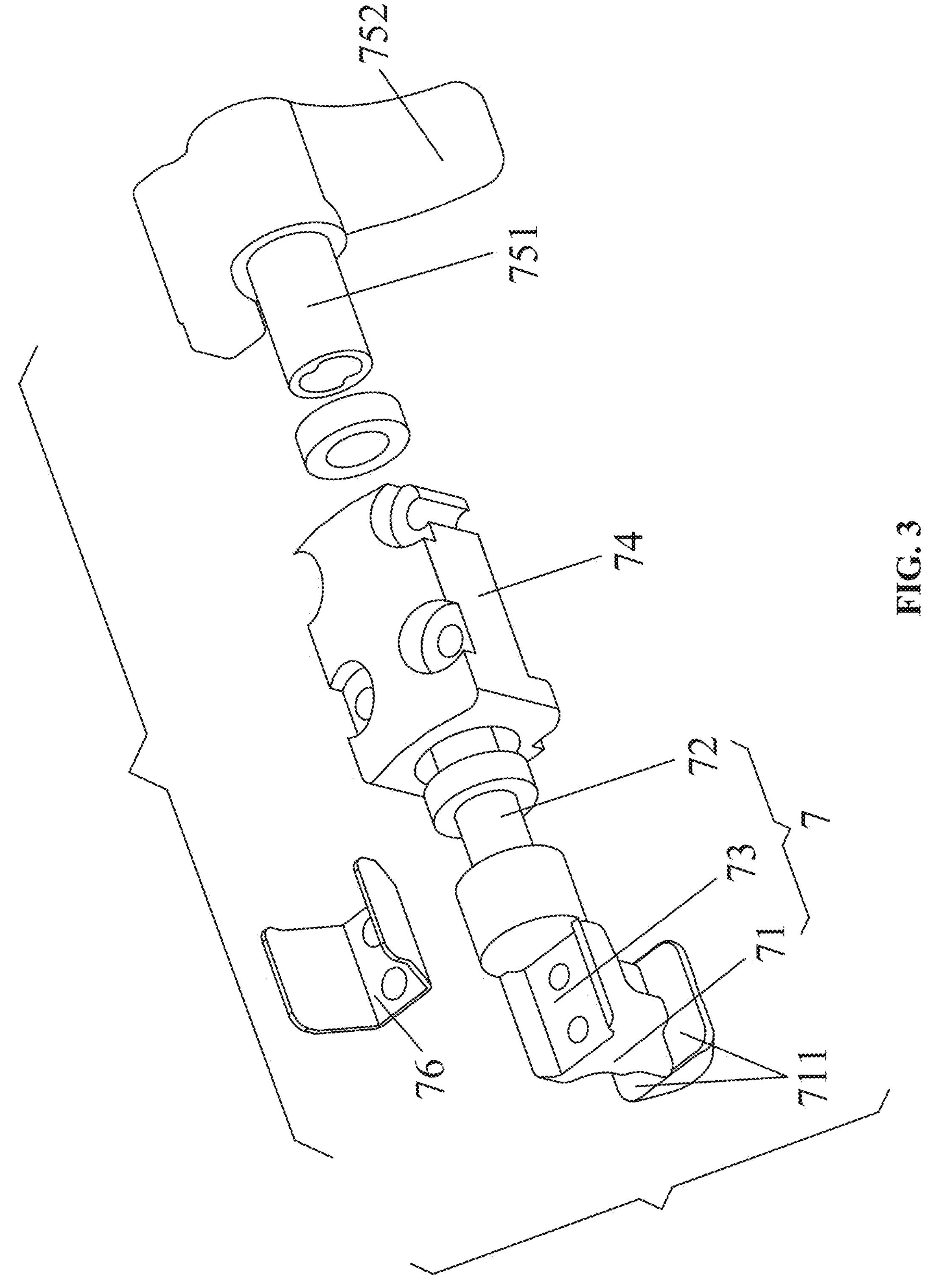
FIG. 3 is an exploded view of a door opening mechanism according to one embodiment of the disclosure.
Figure 4:
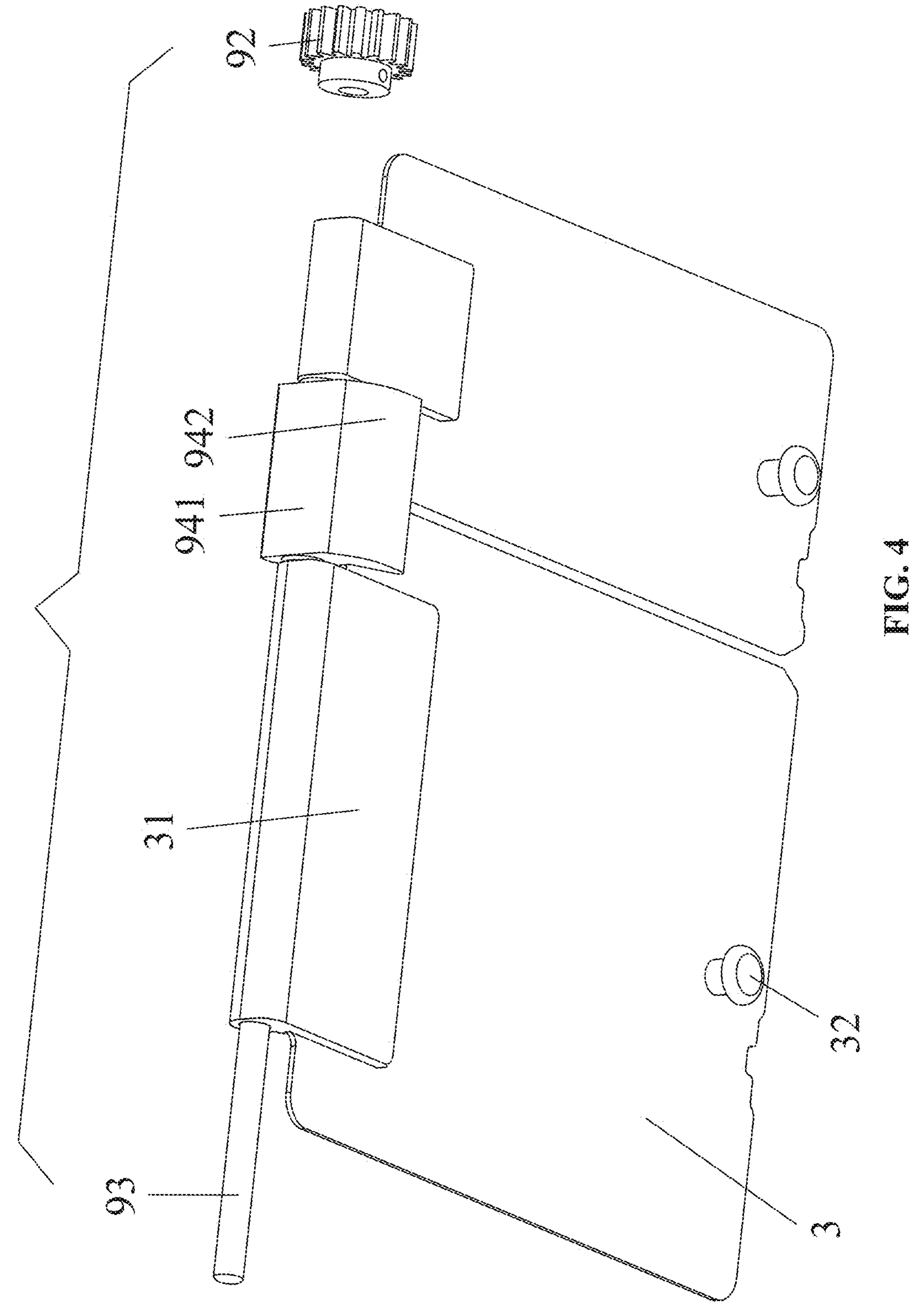
FIG. 4 is a perspective view of a door closing mechanism according to one embodiment of the disclosure.

As shown in FIGS. 1 and 2, the four ingredient boxes 4 are configured to hold the ingredients needed for the dish to be cooked.

The base frame 2 is configured to support the four ingredient boxes 4. The base frame 2 further comprises a crossbeam 21.

The support frame is rectangular in shape. Both ends of the crossbeam 21 are fixedly disposed on the first edge and the second edge of the support frame, respectively, thus forming two windows.

The base frame 2 further comprises two vertical beams configured to support the four ingredient boxes 4. The support frame further comprises a third edge and a fourth edge disposed opposite to the third edge. One of the two vertical beams is disposed between the crossbeam 21 and the third edge, and the other vertical beam is disposed between the crossbeam 21 and the fourth edge, so that each of the two windows is divided into two sub-windows. The four ingredient boxes are respectively disposed into the four sub-windows.

The support frame further comprises a frame handle 23 disposed on the third edge. The frame handle 23 is utilized for user to push or pull the base frame assembly manually.

2. Door Panel 3

As shown in FIGS. 2-7, the four door panels 3 are disposed corresponding to the four sub-windows. Each of the four door panels 3 comprises a movable side and a fixed side opposite to the movable side.

Each of the four door panels 3 further comprises a hinge 31 disposed in the middle of the fixed side. The two door closing mechanism separately comprises a transmission shaft 93. The two transmission shaft are respectively disposed on the third edge and the fourth edge of the support frame. Among the four hinges 31, two hinges are disposed on one of the two transmission shafts, and the other two hinges are disposed on the other transmission shaft.

The side with the frame handle is referred as the front side of the ingredient box assembly. The side with the driven gear is referred as the right side of the ingredient box assembly. The door panel located at the intersection of the right side and the rear side of the box is identified as the first door panel. Therefore, the four door panels are sequentially labeled in a clockwise direction as the first ingredient box, the second ingredient box, the third door panel, and the fourth door panel. Accordingly, the four sub-windows are considered as the first sub-window, the second sub-window, the third sub-window, and the fourth sub-window; and the four ingredient boxes are considered as the first ingredient box, second ingredient box, third ingredient box, and fourth ingredient box.

Each of the four door panels 3 has three operational states, explained below using the first door panel as example:

- in a closed state: the movable side of the first door panel is in contact with the bottom surface of the crossbeam 21; and the first sub-window is covered by the first door panel 3; at this time, the first door panel is located at the closed position;
- in a locked state: the two door opening mechanism separately comprise a lock 7; one of the two locks 7 is configured to press the movable side of the first door panel against the crossbeam 21, thus securing the first door panel 3 in the closed state and forming a sealed space within the first ingredient box; and
- in an open state: one of the two locks 7 releases the movable side from the crossbeam 21, allowing the first door panel 3 to fall and open the first ingredient box; and the ingredients inside the first ingredient box then fall into the frying pan by gravity.

Each of the four door panels 3 further comprises a knob 32 disposed on the bottom surface and located on the movable side. The knob is configured to lift the corresponding door panel 3, thus allows for adding ingredients, cleaning the structural components, or removing the four ingredient boxes 4.

3. Door Opening Mechanism

As shown in FIGS. 2 to 7, the two door opening mechanisms are symmetrically disposed on the crossbeam 21 and are respectively controlled by the two door opening motors 5. Specifically, the two door opening mechanisms comprise a first door opening mechanism and a second door opening mechanism. The first door opening mechanism is disposed on the right side of the ingredient box assembly, and the second door opening mechanism is disposed on the left side of the ingredient box assembly. The first door opening mechanism is configured to control the opening of the first door panel and the second door panel, and the second door opening mechanism is configured to control the opening of the third door panel and the fourth door panel.

The two door opening mechanisms separately comprise the lock 7, a toggling clamp 75, a shaft positioning member 74, a connection shaft, and a spring plate 76.

The lock 7 and the toggling clamp 75 are disposed on both sides of the shafting positioning member 74.

The following describes the door opening mechanism for opening the first door panel and the second door panel.

1. Shaft Positioning Member 74

The shaft positioning member 74 is rectangular in shape. The crossbeam 21 comprises a lock hole in the shape of a rectangle. The boundaries of the lock hole are defined by the inner wall of the crossbeam 211. The shaft positioning member 74 is disposed in the lock hole, and thus is fixedly disposed in the crossbeam 21. One end of the shaft positioning member 74 abuts against the right inner wall of the support frame.

The shaft positioning member 74 comprises a hollow channel through which the lock 7 is connected to the toggling clamp 75.

2. Lock 7

The lock 7 is disposed in the lock hole. The lock 7 comprises a lock shaft 72, a plate receiver 73, and a lock bolt 71.

One end of the lock shaft 72 is inserted into the hollow channel and securely fixed via a bearing. The plate receiver 73 is connected to the connection shaft and comprises a mounting groove The plate receiver 73 is configured to accommodate the spring plate 76.

The lock bolt 71 extends vertically downwards from the plate receiver 73 and reaches below the base frame 2. Alternatively, the lock bolt 71 is integrally formed with the connection shaft.

Preferably, the lock bolt 71 is a double-action lock bolt. One end of the lock bolt 71 is in the shape of a quadrangular pyramid. The quadrangular pyramid is cut into two equal parts, forming a first lock head and a second lock head. The first lock head and the second lock head separately comprises a top platform serving as a lock hook 711. The two lock hooks, referred to a first lock hook and a second lock hook, are respectively disposed below the first sub-window and the second sub-window.

The two lock hooks are respectively configured to press against the bottom surface of the movable side of the corresponding door panel 3 to lock the corresponding sub-window. A gap is formed between each of the two lock hooks 711 and the corresponding door panel 3, allowing the two lock hooks 711 to rotate. When the two lock hooks 711 and the base frame 2 are disposed on the same horizontal plane, the lock bolt 71 is located in an initial position.

For example, when the lock bolt 71 is in the initial position and the lock shaft 72 is rotated in a forward direction, the lock bolt 71 also rotates, causing the first lock hook 711 to move and lock the first door panel 3; at the same time, the second lock hook 711 moves away from the second door panel 3, allowing the second door panel to open; at this time, the lock head 71 is in the unlock position for the second door panel; and when the lock bolt 71 is rotated in a backward direction, the first door panel 3 opens.

Spring Plate 76

The spring plate 76 is U-shaped. The spring plate 76 comprises a bottom plate, a first side plate, and a second side plate. The first side plate and the second side plate are both connected to the bottom plate. The spring plate 76 is disposed in the lock hole, so that the bottom plate, the first side plate, and the second side plate is securely fitted against the inner wall that forms the boundaries of the lock hole.

Toggling Clamp 75

The toggling clamp 75 comprises a shaft sleeve 751 and a toggling handle 752 integrally formed with the toggling handle.

The shaft sleeve 751 is cylindrical. One end of the shaft sleeve 751 is inserted into the hollow channel of the shaft positioning member 74, so as to sleeve the lock shaft 72. The lock shaft 72 and the shaft sleeve 751 are securely locked together. The shaft sleeve 751 and the shaft channel are spaced apart from each other. The other end of the shaft sleeve 751 is connected to the toggling handle 752. The toggling handle 752 is disposed on the second edge of the support frame. The toggling handle 752 comprises an arc-shaped plate. The toggling handle 752 is located below the first support rail 110.

The door opening motor 5 is disposed on the outer wall of the second side wall of the frame body 100. The door opening motor 5 comprises a first output shaft and a drive handle 6. The first output shaft is disposed in the dispersing area. The drive handle 6 is connected to the first output shaft. As the first output shaft rotates, the drive handle 6 rotates as well, thus directing the rotation of the toggling handle 752. The drive handle 6 comprises a longitudinal part and a horizontal part. The longitudinal part is connected to the horizontal part to form a T-shape. The longitudinal part is fixedly connected to the first output shaft. The horizontal part functions as a transmission rod.

When the first door panel and the second door panel are in the closed state or the locked state, the transmission rod is in an initial closed position parallel to the first support rail and the second support rail.

4. Door Closing Mechanism

As shown in FIGS. 2, and 4 to 7, the two door closing mechanisms are disposed on the same side or the different sides of the dispersing area. In the example, the door closing mechanisms are disposed on the same side of the dispersing area. Each of the two door closing mechanisms is driven by the corresponding door closing motor 8, so as to reset the corresponding door panels 3 to the closed position.

Preferably, upon release of the ingredients from the ingredient boxes, the door closing mechanisms close the corresponding door panels 3 to ensure there is sufficient space for the frying pan to function. Therefore, a vertical distance between the bottom surface of the ingredient box assembly and the frying pan positioned below is reduced, facilitating the miniaturization of the intelligent cooking machine.

The door closing mechanism comprises the driven gear 92, a transmission shaft 93, a door closing plate 94, and a drive gear 91. The drive gear 91 is fixedly connected to the door closing motor 8.

The following describes the door closing mechanism for closing the second door panel and the third door panel.

1. Driven Gear 92

The driven gear 92 is sleeved on one end of the transmission shaft 93 and disposed outside the base frame 2. The support frame further comprises two shaft tubes disposed on the bottom surface of the third edge. The other end of the transmission shaft 93 is inserted through two shaft tubes. The transmission shaft 93 is connected to the two shaft tubes by bearings.

The two hinges 31, respectively corresponding to the second door panel and the third door panel, are sleeved on the transmission shaft 93 and disposed apart from each other. The two door panels 3 and the transmission shaft 93 are rotatable relative to each other.

2. Door Closing Plate 94

The door closing plate 94 comprises a shaft sleeve portion 941 and a support plate 942. The shaft sleeve portion 941 is connected to the support plate 942, forming a V-shaped cross-section configuration. The shaft sleeve portion 941 is sleeved on the transmission shaft 93 and disposed between the two hinges 31.

When the second door panel and the third door panel are closed, the support plate 942 forms an acute or right angle with the second door panel and the third door panel; and the driven gear 92 is freely rotatable.

When the second door panel and the third door panel are open, the transmission shaft 93 is rotated, bring the door closing plate 94 into contact with the bottom surface of the second door panel and the third door panel. The contact pushes the second door panel and the third door panel back to the closed position.

The support plate 942 is shared between the second door panel and the third door panel in the same manner. Portions of the support plate 942 are disposed on parts of each of the second door panel and the third door panel.

3. Drive Gear 91

The drive gear 91 is an incomplete gear. The incomplete gear comprises a toothed section and a toothless section. The door closing motor 8 is disposed on the outer wall of the second side wall of the frame body 100 and comprises a second output shaft. The second output shaft is disposed in the dispersing area and below the second support rail 110. The drive gear 91 is fixedly connected to the second output shaft. The toothed section is in external mesh with the driven gear 92.

Figure 5:
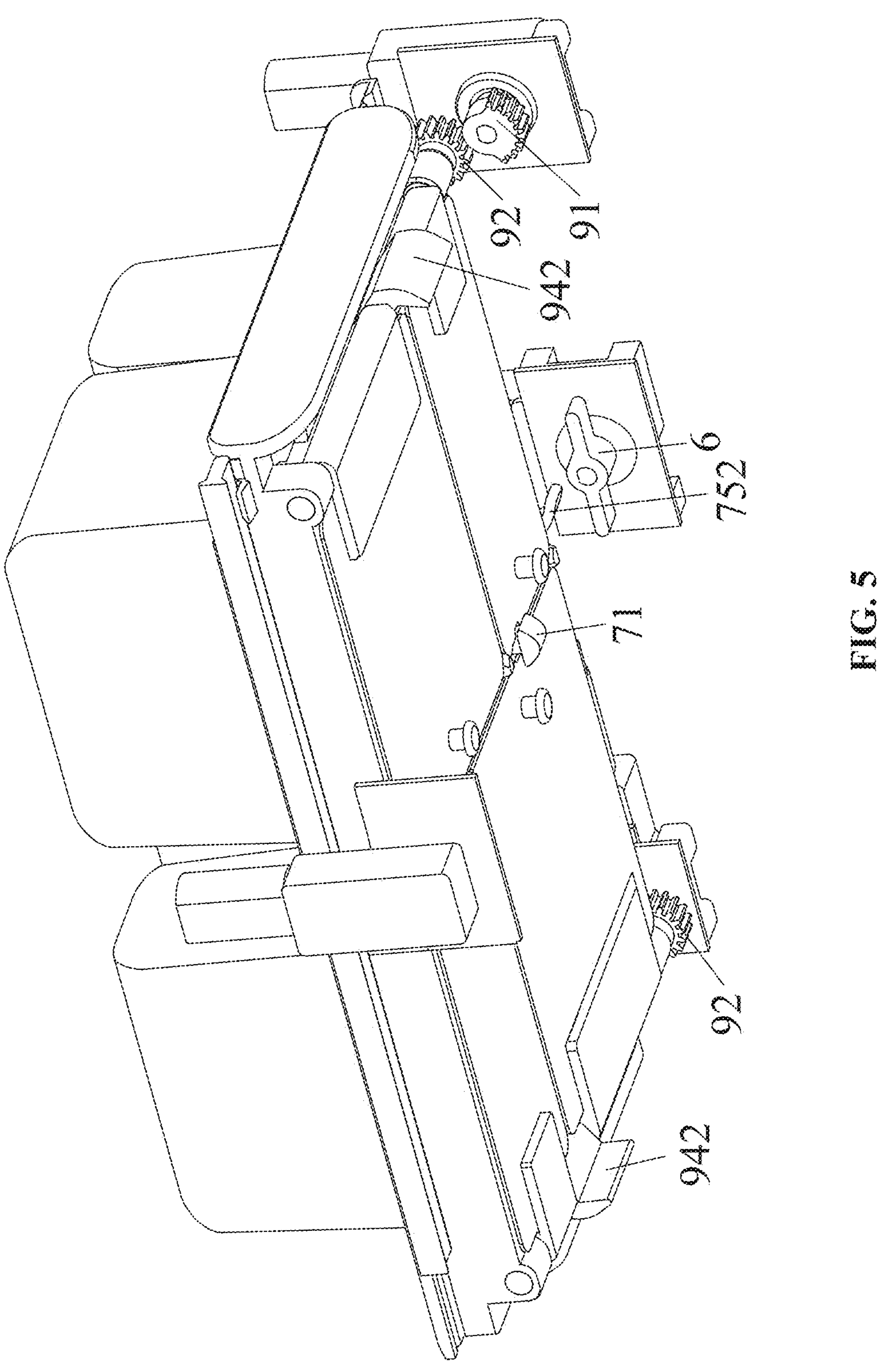
FIG. 5 is a perspective view of an ingredient box assembly with four door panels in a locked state according to one embodiment of the disclosure.
Figure 6:
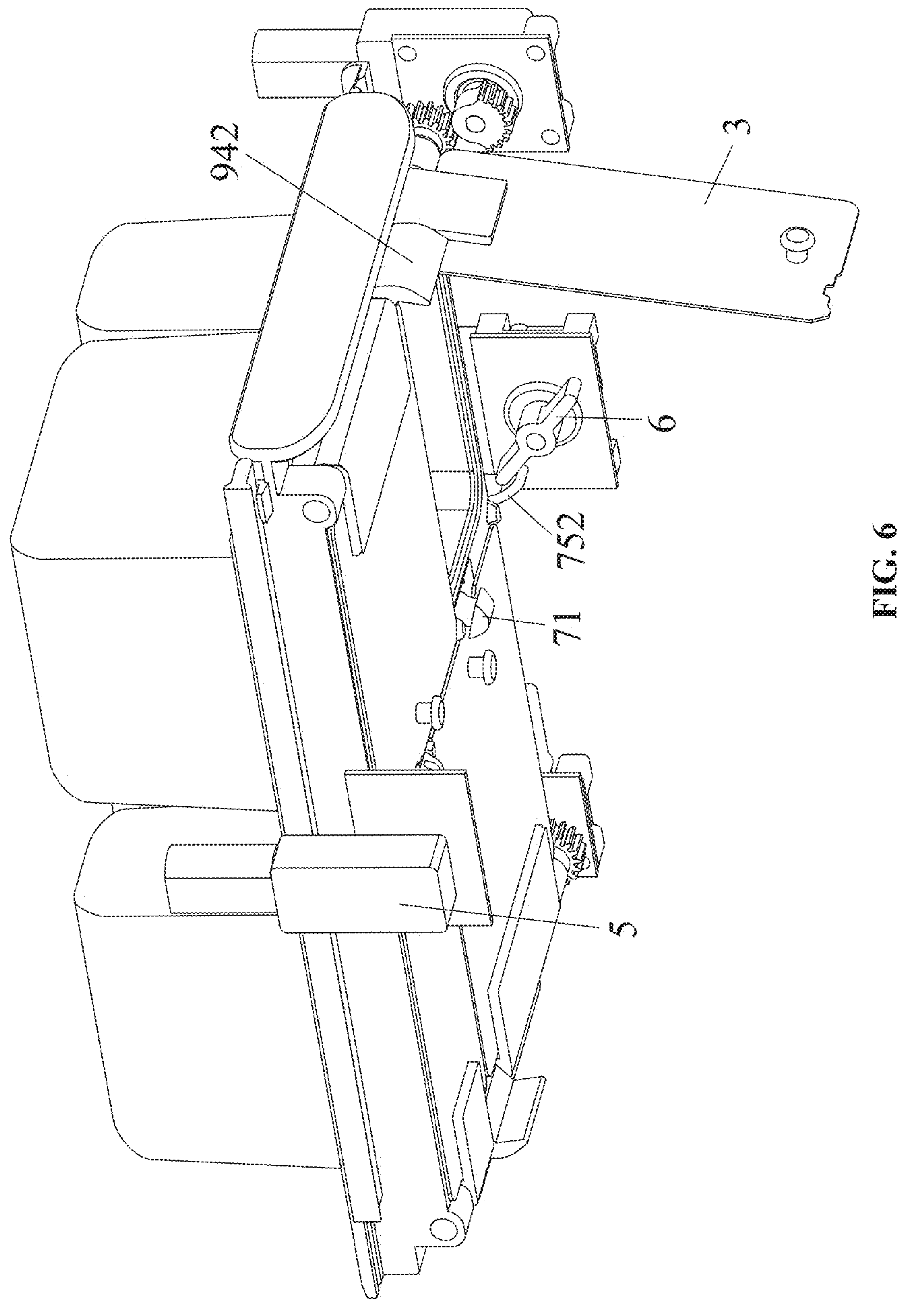
FIG. 6 is a perspective view of an ingredient box assembly with four door panel in an open state according to one embodiment of the disclosure.

As shown in FIGS. 5 and 6, when the second door panel and the third door panel are in the open state or the locked state, the toothless section faces the driven gear 92 (referred as an initial position of the drive gear 91).

Figure 7:
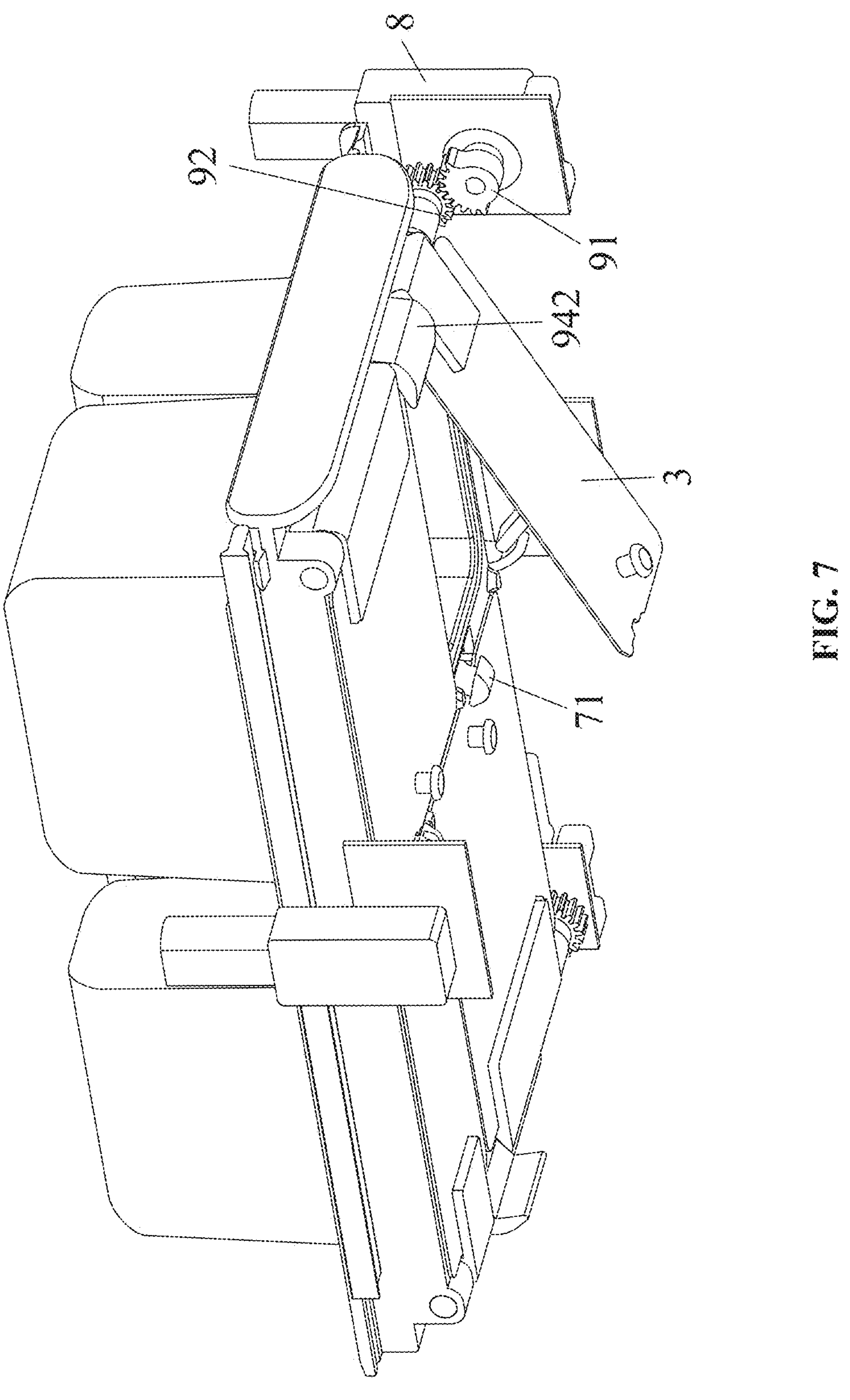
FIG. 7 is a schematic diagram of a door panel being reset to a closed state according to one embodiment of the disclosure.

As shown in FIGS. 5, 6, and 7, the following describes an action process of the second door panel 3 upon receiving a dispersing command from a main control circuit.

1. Activation of the Door Opening Mechanism Causes the Second Door Panel to Open.

When the second door panel is in the closed state and the door opening motor 5 is activated, the corresponding drive handle 6 rotates in reverse from an initial closed position until contacting the toggling handle 752. As the drive handle 6 continues rotating, the toggling handle 752 and the shaft sleeve 751 are also rotated, resulting in rotation of the lock shaft 72, the spring plate 76, and lock bolt 71 forward. Consequently, the second lock hook, in contact with the second door panel 3, rotates to the unlock position, thereby opening the second door panel 3, allowing the ingredients inside the compartment to fall out and into the frying pan.

2. Activation of the Door Closing Mechanism Resets the Second Door Panel to the Initial Closed Position.

After the ingredients have been fallen into the frying pan, the door closing motor 8 is activated, causing the drive gear 91 to rotate in reverse until the toothed section externally meshes with the driven gear 92. As the drive gear 91 continues rotating, the transmission shaft 93 and the door closing plate 94 also rotate forward, causing the support plate 942 to lift the second door panel 3, thus returning the second door panel 3 to the initial closed position.

3. Activation of the Door Opening Mechanism Causes the Door Panel 3 to Lock.

After the second door panel 3 is reset to the initial closed position, the door opening motor 5 is activated, causing the drive handle 6 to rotate and disengage from the toggling handle 752. As a result, the spring plate 76 compresses and generates a rebound force, rotating the lock bolt 71 forward to lock the second door panel 3 again. Then, the drive handle 6 continues rotating to the initial closed position.

4. Resetting of the Support Plate 942 and the Drive Gear 91.

The door closing motor 8 rotates in reverse until the toothed section of the drive gear 91 disengages from the driven gear 92 and returns to the initial position. As a result, the transmission shaft 93 is rotated, causing the support plate 942 to rotate away from the second door panel 3 and reset to the initial position.

The support plate 942 is reset to the initial position, allowing the adjacent door panel to be opened without any obstructions.

The drive gear 91 is reset, allowing the base frame 2 to move smoothly along the first support rail and the second support rail.

Preferably, the following two methods are provided to dispose the ingredient boxes 4 on the base frame 2.

First Method

Preferably, the four ingredient boxes 4 comprise hard plastic. The four ingredient boxes pass through the sub-windows and are disposed along the bottom edge of the sub-windows. Each of the sub-windows comprises at least one locking hole at the bottom edge. The outer walls of each of the four ingredient boxes comprise at least one locking block. The at least one locking block is snapped into the corresponding at least one locking hole, so that the ingredient boxes are secured to the base frame 2.

Each of the four door panels 3 comprises a first groove and a first seal ring (not shown in the drawings). The first seal ring is disposed inside the first groove to seal the corresponding ingredient box. The sealing ability ensures the fluid ingredients, such as egg liquid, are securely contained within the compartments, increasing the diversity of the dishes that can be prepared.

Second Method (not Shown in the Drawings)

The four ingredient boxes 4 are disposed on the base frame 2 using at least two snap-fit joints. Preferably, the at least two snap-fit joints separately comprises a strip-shaped snap bar. The at least two strip-shaped snap bars are disposed on the third edge and the fourth edge of the base frame 2, respectively. The base frame 2 comprises at least two through holes disposed on the third edge and the fourth edge, respectively. Both ends of each of the at least two strip-shaped snap bars are rotatably inserted into the corresponding at least two through holes. The ingredient boxes 4 each comprises a first open edge and a second open edge disposed opposite to the first open edge. The bottom surface of the first open edge and the second open edge separately comprises at least two strip-shaped snap slots. The first open edge and the second open edge are disposed on the bottom surface of the base frame 2, with each compartment opening facing the corresponding sub-window. The at least two strip-shaped snap bars are rotatably inserted into the at least two strip-shaped snap slots, so that the ingredient boxes 4 are disposed on the base frame 2. Each of the sub-windows comprises an inner edge, a second groove, and a second seal ring. The second groove is disposed on the inner edge, and the second seal ring is disposed within the second groove.

It will be obvious to those skilled in the art that changes and modifications may be made, and therefore, the aim in the appended claims is to cover all such changes and modifications.

What is claimed is:

1. A feeding device for an intelligent cooking machine, the feeding device comprising a base frame, at least one ingredient box, at least one door panel, at least one door opening mechanism, at least one door opening motor, at least one door closing mechanism, and at least one door closing motor;

wherein:

the at least one ingredient box matches with the at least one door panel in number; the at least one door panel is disposed on the base frame; the at least one door opening mechanism and the at least one door opening motor are configured to control an opening of the at least one door panel; the at least one door closing mechanism and the at least one door closing motor are configured to control a reset and closure of the at least one door panel; the at least one door opening mechanism is disposed on the base frame; the door opening mechanism comprises a lock comprising a lock bolt; the lock bolt is movable from a locked position to an open position, allowing the at least one door panel to remain open; when the at least one door closing mechanism moves the at least one door panel from the open position back to a closed position, a main control circuit controls the lock bolt to return to the locked position, thereby ensuring that the at least one door panel is securely locked.

2. The feeding device of claim 1, wherein the lock bolt is a double-action lock bolt; the feeding device comprises at least two ingredient boxes and at least two door panels; the at least two door panels are disposed adjacent to each other; the double-action lock bolt comprises a first lock head and a second lock head; the first lock head is moved to the open position and disengages from a corresponding door panel, thereby allowing the corresponding door panel to open; the movement of the first lock head causes the second lock head to rotate toward the adjacent door panel, thereby ensuring that the adjacent door panel is closed.

3. The feeding device of claim 2, wherein the at least one door opening mechanism further comprises a toggling clamp, a shaft positioning member, and a spring plate; the toggling clamp comprises a toggling handle; the shaft positioning member is fixedly disposed on the base frame; the lock further comprises a plate receiver and a lock shaft; the lock shaft is disposed in the shaft positioning member; the toggling clamp is disposed outside the base frame; the lock shaft is connected to the toggling clamp, such that the lock is controlled by the toggling clamp; the at least one door opening motor comprises a drive handle and a first output shaft; the drive handle is connected to the first output shaft; when the at least one door opening motor is activated, the first output shaft rotates, causing the drive handle to rotate from the closed position in one direction; as the drive handle rotates, the toggling handle is pressed, causing the lock bolt to rotate away from the corresponding door panel; when the drive handle rotates from the closed positon in an opposite direction, the lock bolt is rotated away from the adjacent door panel; the spring plate is disposed on the plate receiver; when the drive handle is rotated to the closed position, the spring plate pushes the lock bolt back to the closed position, thereby ensuring that the corresponding door panel is closed.

4. The feeding device of claim 3, wherein the at least one door closing mechanism comprises a driven gear, a transmission shaft, a door closing plate, and a drive gear; the drive gear is an incomplete gear; the at least one door closing motor comprises a second output shaft; the drive gear is sleeved on the second output shaft; the driven gear is disposed outside the base frame; the drive gear is in external mesh with the driven gear; the driven gear is sleeved on one end of the transmission shaft; each of the at least two door panels comprises a hinge sleeved on the transmission shaft; and the at least two door panels are pivotally disposed relative to the transmission shaft; the door closing plate comprises a shaft sleeve portion and a support plate; the shaft sleeve portion is disposed between the hinges of the at least two door panels; the shaft sleeve portion is fixedly connected to the transmission shaft; when the support plate and corresponding two door panels are in a horizontal state, parts of the support plate overlap with parts of the corresponding two door panels; when the at least one door closing motor drives the drive gear to rotate forward, the support plate lifts the corresponding two door panels to the closed position.

5. The feeding device of claim 4, wherein after the support plate lifts the corresponding two door panels to the closed position, the corresponding two door panels are locked by the lock bolt, and the drive gear is rotated reversely to disengage from the driven gear.

6. The feeding device of claim 5, wherein the intelligent cooking machine further comprises a machine frame; and the base frame comprises a frame handle; the frame handle allows an operator to manually insert the feeding device into the machine frame; the frame handle is disposed on one side of the feeding device, and the one side of the feeding device is defined as a front side of the feeding device.

7. The feeding device of claim 5, wherein each of the at least two door panels comprises a bottom surface and a knob; the knob is disposed on the bottom surface; and the knob is configured to open the corresponding door panel before adding ingredients into the at least two ingredient boxes.

8. The feeding device of claim 7, wherein the at least two ingredient boxes comprise hard plastic; the base frame comprises a support frame and a crossbeam; the support frame is rectangular in shape; the crossbeam is connected to the support frame, thereby forming two windows within the support frame; the at least two ingredient boxes respectively pass through the two windows; each of the at least two ingredient boxes comprises a rim disposed on a perimeter of each of the two windows; the at least two door panels are separately pressed against the corresponding window.

9. The feeding device of claim 7, wherein the at least two ingredient boxes comprise hard plastic; the base frame comprises a support frame and a crossbeam; the support frame is rectangular in shape; the crossbeam is connected to the support frame, thereby forming two windows within the support frame; each of the at least two ingredient boxes is fixedly disposed on a bottom surface of the base frame through a snap-fit joint; the at least two door panels are separately pressed against the corresponding window.

* * * * *